(12) United States Patent
Hanson

(10) Patent No.: US 8,348,166 B2
(45) Date of Patent: Jan. 8, 2013

(54) SYSTEM AND METHOD FOR SURVEYING WITH A BARCODE TARGET

(75) Inventor: Nigel Peter Hanson, Christchurch (NZ)

(73) Assignee: Trimble Navigation Limited, Westminster, CO (US)

( * ) Notice: Subject to any disclaimer, the term of this patent is extended or adjusted under 35 U.S.C. 154(b) by 234 days.

(21) Appl. No.: 12/123,973

(22) Filed: May 20, 2008

(65) Prior Publication Data

US 2009/0289120 A1 Nov. 26, 2009

(51) Int. Cl.
*G06K 7/10* (2006.01)
*G06K 9/36* (2006.01)
*G06K 9/80* (2006.01)

(52) U.S. Cl. ............... 235/462.1; 235/375; 235/462.01; 235/462.08; 235/462.09; 235/462.45

(58) Field of Classification Search ............... 235/462.01–472.03, 375
See application file for complete search history.

(56) References Cited

U.S. PATENT DOCUMENTS

| | | | |
|---|---|---|---|
| 5,076,690 A | 12/1991 | deVos et al. | |
| 5,270,936 A | 12/1993 | Fukushima et al. | |
| 5,739,785 A | 4/1998 | Allison et al. | |
| 5,825,298 A | 10/1998 | Walter | |
| 5,837,986 A * | 11/1998 | Barile et al. | 235/462.01 |
| 6,621,417 B2 | 9/2003 | Duncan et al. | |
| 7,386,276 B2 | 6/2008 | Sama et al. | |
| 7,511,662 B2 | 3/2009 | Mathews et al. | |
| 2004/0234123 A1 * | 11/2004 | Shirai et al. | 382/154 |
| 2005/0211777 A1 * | 9/2005 | Wetzel et al. | 235/385 |
| 2005/0222767 A1 * | 10/2005 | Odamura | 701/213 |
| 2006/0109131 A1 | 5/2006 | Sen et al. | |
| 2006/0136129 A1 * | 6/2006 | Yokozawa | 701/211 |
| 2006/0162207 A1 | 7/2006 | Morton et al. | |
| 2006/0184013 A1 * | 8/2006 | Emanuel et al. | 600/426 |
| 2006/0220955 A1 | 10/2006 | Hamilton | |
| 2007/0081168 A1 * | 4/2007 | Johnston | 356/614 |
| 2008/0074638 A1 * | 3/2008 | Sakimura et al. | 356/4.01 |
| 2008/0082701 A1 * | 4/2008 | Pavel et al. | 710/10 |
| 2009/0180667 A1 * | 7/2009 | Mahan et al. | 382/103 |

* cited by examiner

*Primary Examiner* — Tuyen K Vo

(74) *Attorney, Agent, or Firm* — Haynes and Boone, LLP

(57) ABSTRACT

System and method for surveying. In one embodiment, a process is provided including detecting a barcode associated with a position of interest. The barcode may be decoded to extract data associated with the position of interest. Additionally, decoded data associated with the position of interest can be presented to an operator of a surveying tool.

20 Claims, 5 Drawing Sheets

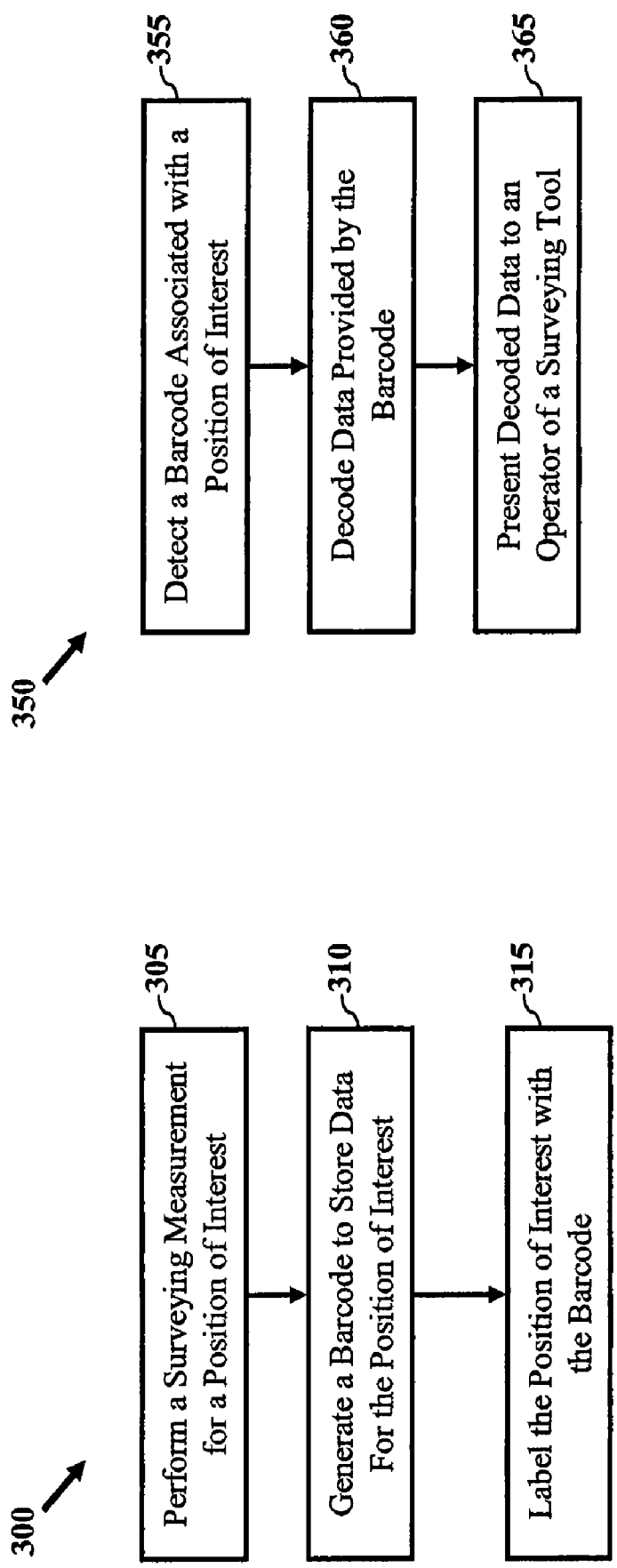

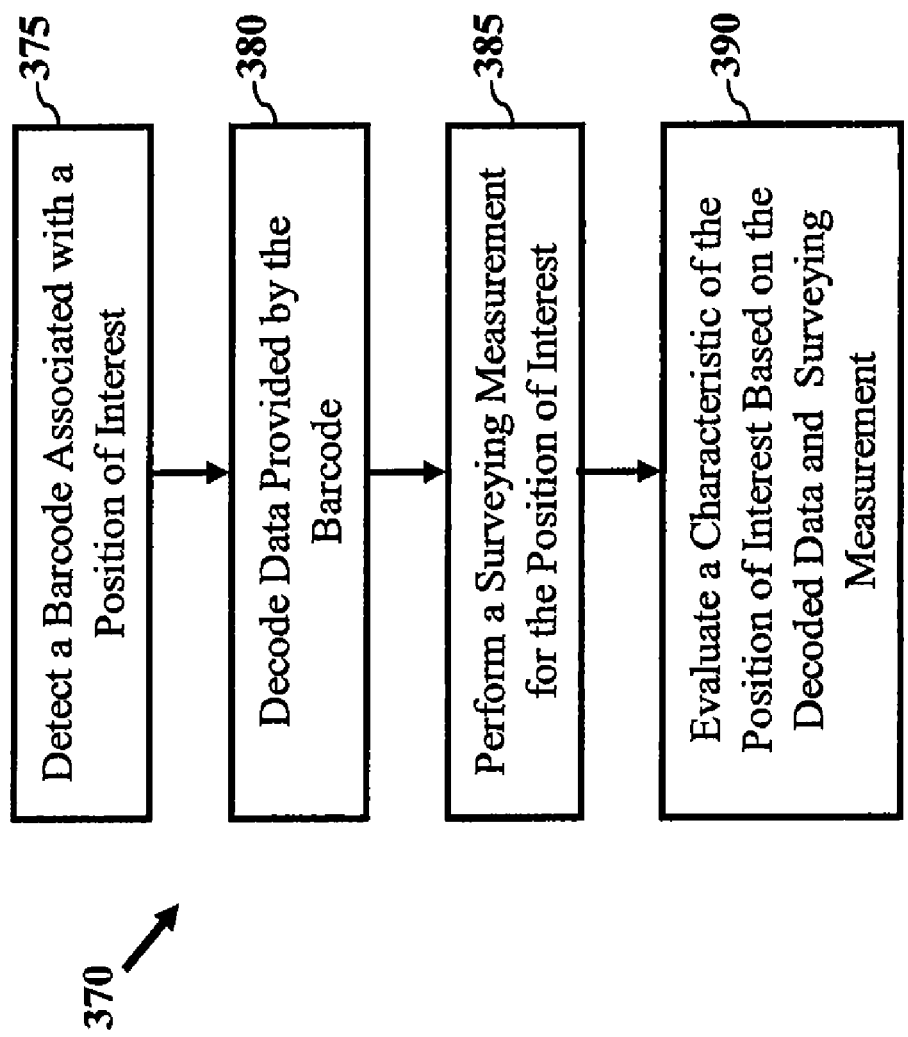

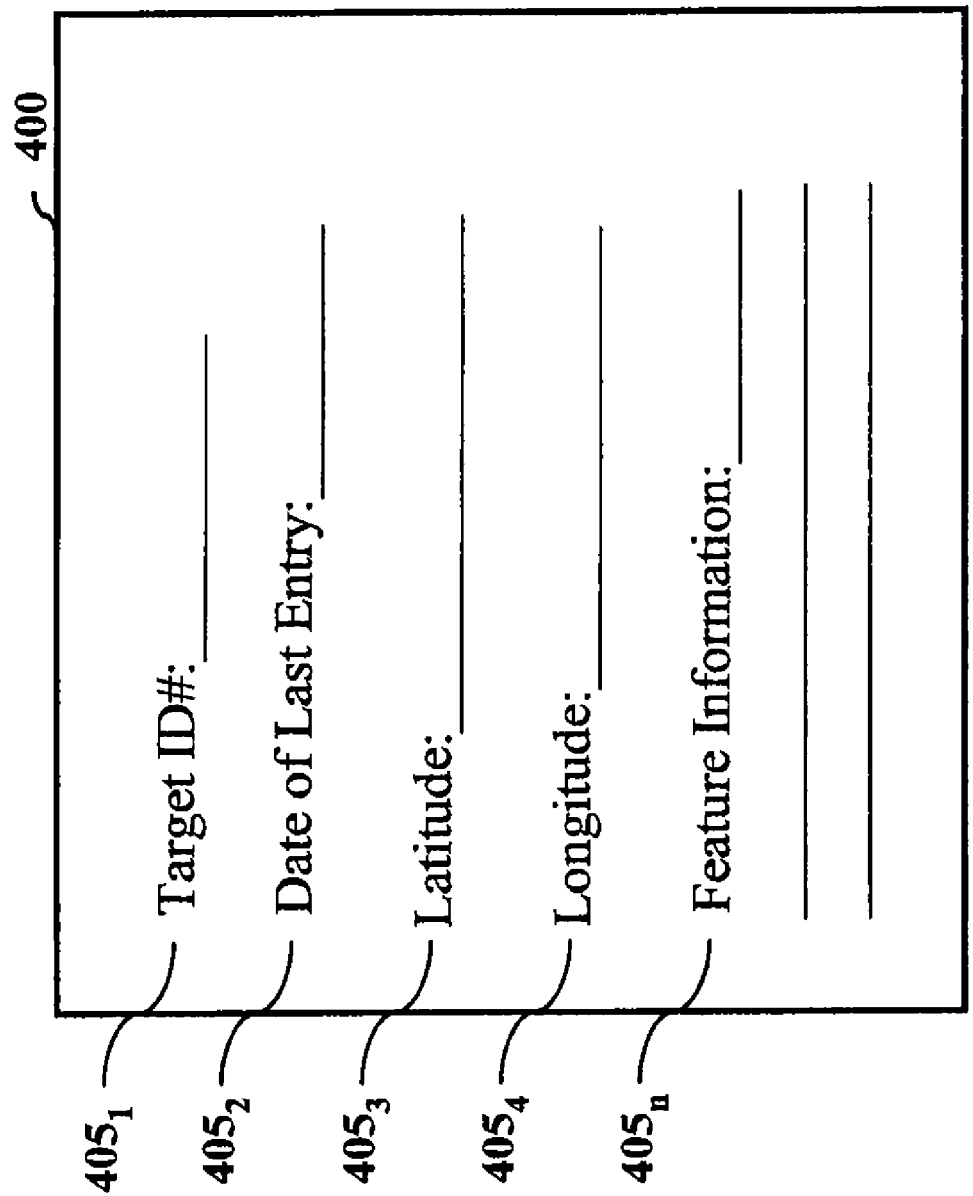

SYSTEM AND METHOD FOR SURVEYING WITH A BARCODE TARGET

FIELD OF THE INVENTION

The present invention relates in general to a method and apparatus for surveying and more particularly to providing data associated with a position of interest.

BACKGROUND

Conventional methods and devices for surveying typically utilize surveying markers to provide positioning information. For example, surveying stakes may be used to mark a boundary of a plot of land. However, such markers are limited in their ability to provide data associated with the position. Similarly, surveying targets are also limited in their ability to provide information associated with a particular location. Such methods do not allow for providing data associated with the position of interest.

While conventional methods provide surveying marks to mark a position, such marks struggle to meet requirements for providing information associated with a position of interest.

BRIEF SUMMARY OF THE INVENTION

Disclosed and claimed herein are a system and method for surveying with a survey target. In one embodiment, a method is provided including detecting a barcode associated with a position of interest. The barcode can be decoded to extract data associated with the position of interest. Decoded data associated with the position of interest can be presented to an operator of a surveying tool.

Other aspects, features, and techniques of the invention will be apparent to one skilled in the relevant art in view of the following detailed description of the invention.

BRIEF DESCRIPTION OF THE DRAWINGS

FIGS. 3A-3C depict processes according to one or more embodiments of the invention; and FIG. 4 depicts a graphical representation of surveying data according to one embodiment of the invention.

DETAILED DESCRIPTION OF EXEMPLARY EMBODIMENTS

One aspect of the present invention is directed to providing information for a position of interest. As used herein, a position of interest may refer to a particular global position, such as a position marked by a surveying marker. In one embodiment, a surveying measurement may be performed for the position of interest. The measurement data may be encoded in a barcode. According to another embodiment, the position of interest can be labeled with the barcode. Further, the barcode may be used as a surveying target by the surveying tool.

Another embodiment of the invention is to provide a surveying tool configured to detect and decode a barcode associated with at least one position of interest. The surveying tool may further be configured to provide decoded data to a user of the surveying tool. According to another embodiment, the surveying tool may be configured to perform a surveying measurement for the position of interest. Measurement results may then be compared to decoded barcode data to determine changes associated with the position of interest. For example, a change in elevation, and/or global position, of the position of interest may be determined by the survey controller.

According to another embodiment, a process is provided for performing a surveying measurement including at least one barcode associated with a position of interest. The process may include performing a surveying measurement for at least one position of interest and encoding a result of the surveying measurement into a barcode. According to another embodiment, the process may include decoding a barcode associated with a position of interest and presenting decoded data to a user.

Another aspect of the invention is directed to a system for performing surveying measurements for a position of interest labeled with a barcode. In one embodiment, the system may include a surveying tool in communication with at least one target associated with the position of interest. The system may further include a wired and/or wireless link to a processing station or server. The processing station may be configured for post-processing of collected surveying data. To that end, the system may provide automated monitoring of a position of interest.

When implemented in software, the elements of the invention are essentially the code segments to perform the necessary tasks. The program or code segments can be stored in a processor readable medium. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, etc. The code segments may be downloaded via computer networks such as the Internet, Intranet, etc.

Figure 1:
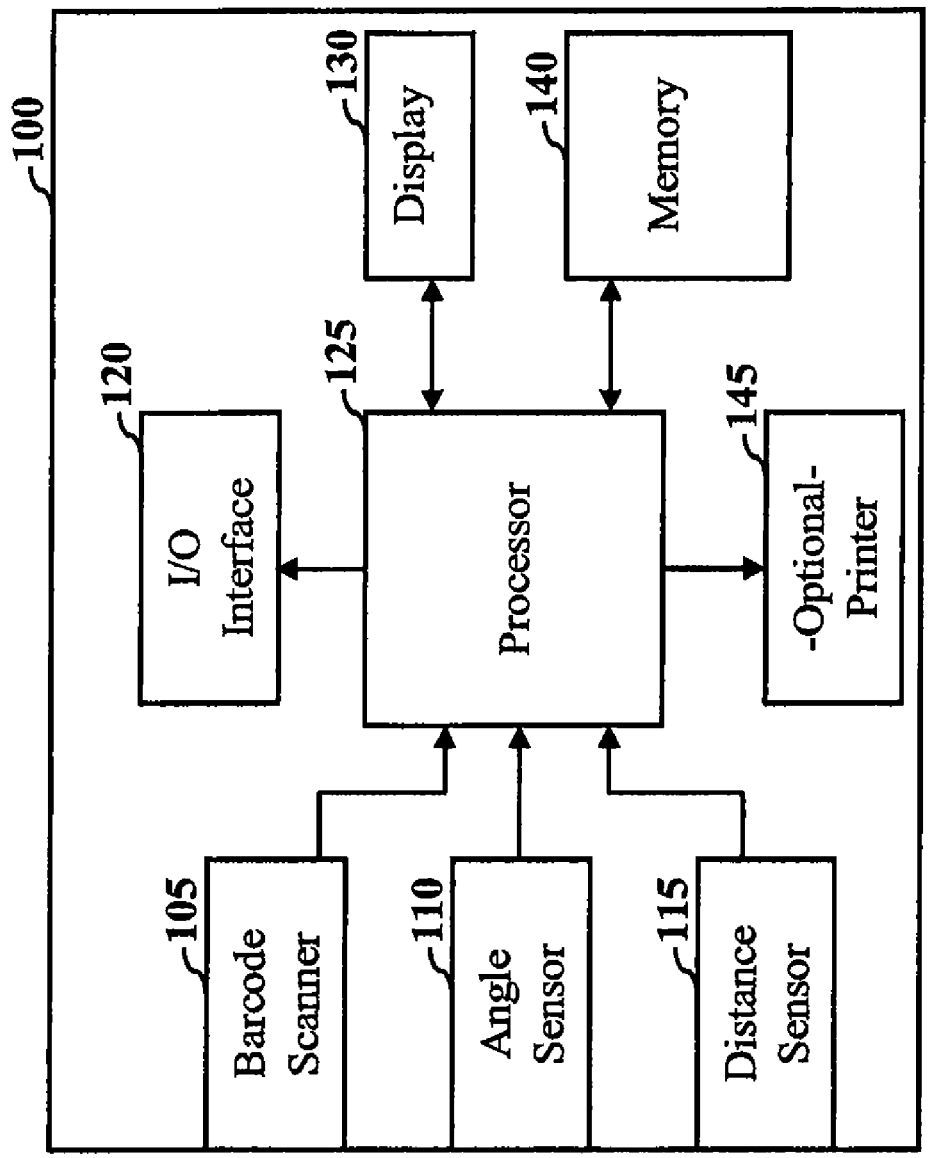
FIG. 1 depicts a simplified block diagram of a surveying tool according to one or more embodiments of the invention.

Referring now to the drawings, FIG. 1 illustrates a simplified block diagram of a surveying tool according to one or more embodiments of the invention. As shown in FIG. 1, surveying tool 100 includes a barcode scanner 105 coupled to processor 125. Barcode scanner 105 can be configured to detect a barcode associated with a position of interest. In one embodiment, barcode scanner 105 may relate to a laser scanner and/or imaging device. It may also be appreciated that barcode scanner 105 may provide both a laser scanner and image device. To that end, barcode scanner 105 may be configured to detect a barcode associated with a position of interest within the range of 1 to 15 meters. However, it also may be appreciated that barcode scanner 105 may be configured to operate in other ranges. According to another embodiment, barcode scanner 105 may be configured to detect at least one of a barcode, two-dimensional barcode, matrix code, monochromatic barcode, color barcode and any type of barcode in general.

According to another embodiment, surveying tool 100 can determine surveying data associated with a position of interest. Angle sensor 110 may provide one or more output signals associated with the angular position of a position of interest in relation to surveying tool 100. Distance sensor 115 may provide one or more output signals indicating the distance to a position of interest from the surveying tool 100. Output from angle sensor 110 and distance sensor 115 may be collected by processor 125 to determine at least one of an elevation, grade, and surveying data in general. Processor 125 can output measurement data and/or data received from barcode scanner 105 using I/O interface 120. According to another embodiment, processor 125 can be any type of processor such as a microprocessor, field programmable gate array (FPGA) and/or application specific integrated circuit (ASIC). Measurement data can be stored by memory 140. Memory 140 can be any type of memory, such as a ROM or RAM memory. It may also be appreciated that measurement data collected by surveying tool 100 may be presented to a user by display 130.

As described above, surveying tool 100 may be configured to determine a surveying measurement for a position of interest labeled with a barcode. However, it may also be appreciated that surveying tool 100 can determine at least one surveying measurement for a position of interest and generate a barcode using optional printer 145. Optional printer 145 may be configured to print a barcode label which may be generated in the field for a position of interest.

Figure 2A:
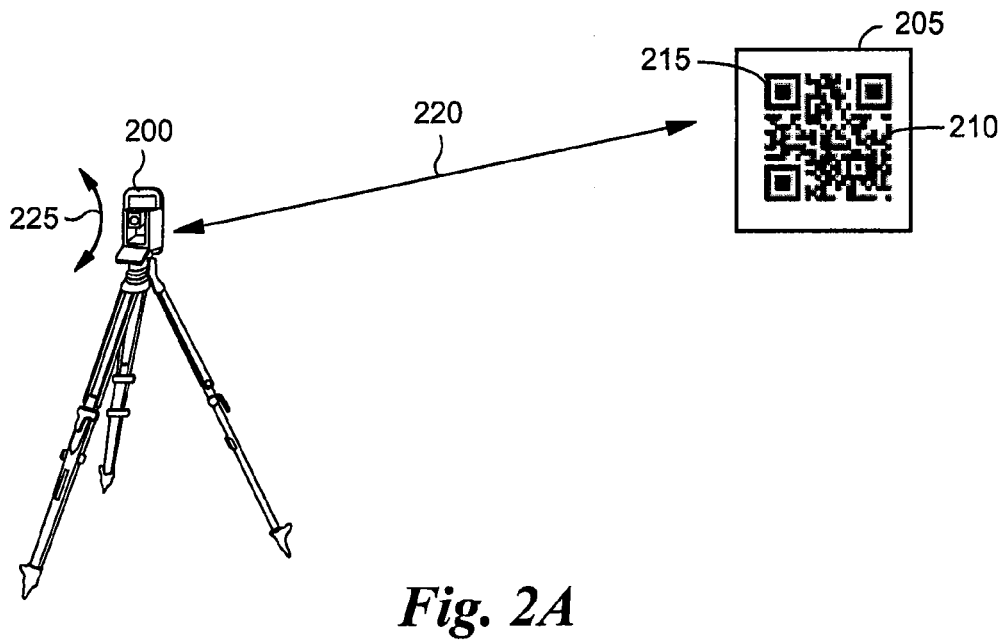
FIGS. 2A-2B depict embodiments of a system according to one or more embodiments of the invention.
Figure 2B:
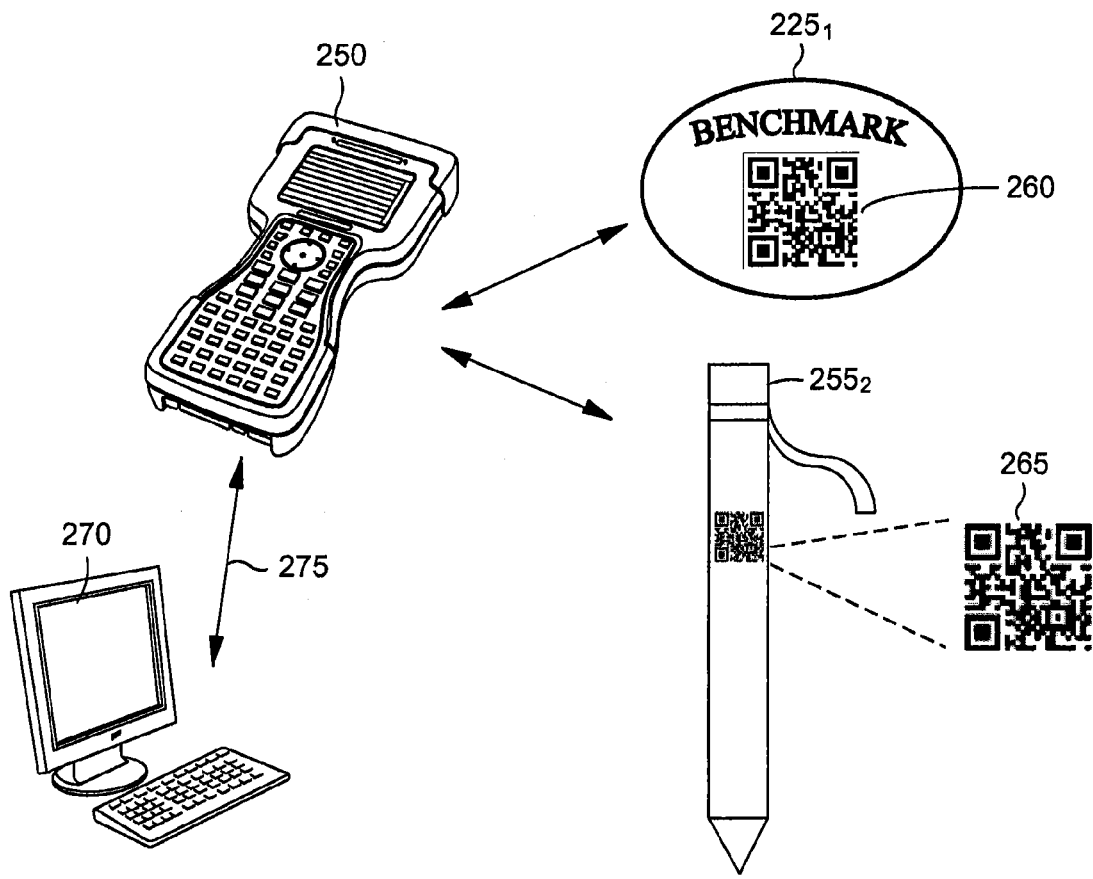

Referring now to FIGS. 2A-2B, simplified system diagrams are shown according to one or more embodiments of the invention. Referring first to FIG. 2A, surveying tool 200 (e.g., surveying tool 105) may be configured to perform a surveying measurement and/or detect a barcode 210 associated with a position of interest 205. For example, surveying tool 200 may be configured to determine a distance, shown as 220, to the position of interest 205. Further, surveying tool 200 can determine an angular offset, shown as 225, for the position of interest in relation to surveying tool 200. As shown in FIG. 2A, barcode 210 is depicted as a two-dimensional barcode. However, it may also be appreciated that barcode 210 can be any type of barcode, such as a matrix code, monochromatic barcode, color barcode and any type of barcode in general. It should be appreciated that barcode 210 can include position mark 215 which may be used by surveying tool 200 to decode data. For example, position mark 215 may provide a reference to determine the orientation of barcode 210. As such, surveying tool 200 can provide omni-directional decoding of barcode targets.

According to another embodiment of the invention, surveying tool 200 may be configured to detect barcodes of various dimensions. In certain embodiment, the dimensions of barcode 210 can limit the amount of data which may be encoded into the barcode. However, it should be appreciated that barcode 210 may be produced having a variety of dimensions. When used as a surveying target, barcode 210 may conform to a predefined surveying target size. The following table provides exemplary values of the maximum number of characters which can be encoded by barcode 210 according to one embodiment of the invention. While the values presented relate to an exemplary maximum number of characters encoded by barcode data, it may be appreciated that barcode 210 may be decoded with less characters. It should also be appreciated that surveying tool 200 could decode a barcode target having data exceeding the exemplary values.

TABLE 1

BARCODE DATA CAPACITY

| | |
|---|---|
| Numeric | Max. 7,089 characters |
| Alphanumeric | Max. 4,296 characters |
| Binary (8 bits) | Max. 2,953 characters |
| Kanji, full-width Kana | Max. 1,817 characters |

According to another embodiment of the invention, surveying tool 200 may be configured to perform a surveying measurement and/or detect a barcode 210 from a distance. As such, risk associated with performing a surveying measurement in a high risk site, such as earth movement, may be reduced. Further, barcode 210 may be produced at relatively low cost. In that fashion, monitoring a position of interest in a high risk site may be performed by surveying tool 200.

According to another embodiment of the invention, surveying tool 200 may be configured to detect barcode 210 from a distance. Data encoded within barcode 210 may be used for orientation of surveying tool 200. As such, surveying tool 200 can use data encoded by barcode 210 to provide directional information to the user of the surveying tool 200.

Referring now to FIG. 2B, surveying tool 250 is presented as another embodiment of surveying tool 200. As shown in FIG. 2B, surveying tool 250 can detect a barcode associated with a variety of surveying markers and is shown in FIG. 2B as being a field instrument which can be used to detect a barcode target from close proximity according to one embodiment of the invention. As such, surveying tool 250 may include a barcode scanner (e.g., barcode scanner 105) configured to detect barcode 260 coupled to a surveying mark 225 and/or barcode 265 coupled to a surveying mark 255. As shown in FIG. 2B, surveying marks 225 and 255 are shown as a benchmark and surveying stake, respectively. However, it may be appreciated that surveying tool 250 can detect barcodes coupled to any type of surveying marker in general. Detection of barcode 260 and/or 265 may be used to determine position of the surveying tool 250 by decoding data associated with the barcodes. According to another embodiment of the invention, surveying tool 250 can provide detected barcodes to a central processor 270 for collection and processing over communication link 275. Communication link 275 may be one of a wired or wireless data link.

Referring now to FIGS. 3A-3C, processes are shown according to one or more embodiments of the invention. Referring first to FIG. 3A, process 300 is shown for labeling a position of interest with a barcode. Process 300 may be initiated by performing a surveying measurement for the position of interest (e.g., position of interest 205), at block 305, by a surveying tool (e.g., surveying tool 100). Measurement data may be encoded as a barcode at block 310. The barcode may be encoded to store measurement data and/or user provided data as described below with more detail with respect to FIG. 4. Process 300 may further include labeling a position of interest with the barcode at block 315.

Referring now to FIG. 3B, process 350 is shown for decoding barcode data according to one embodiment of the invention. Process 350 may be initiated with detection of a barcode associated with a position of interest, at block 355, by a surveying tool (e.g., surveying tool 100). The barcode may be detected by imaging and/or laser scanning. In one embodiment, detection of a barcode target in block 355 may include optical processing such as enlarging and focusing to read barcode data. Data encoded in the barcode may be decoded by the barcode scanner in block 360. Decoded data may be stored in a memory (e.g., memory 140). The decoded data may be presented by a surveying tool display (e.g., display 130) in block 365.

Referring now to FIG. 3C, process 370 is shown for monitoring a position of interest according to one embodiment of the invention. Process 370 may be initiated by detecting a barcode associated with a position of interest, in block 375, by a surveying tool (e.g., surveying tool 100). The barcode may be decoded at block 380 by the surveying tool. A surveying measurement can be performed for the position of interest at block 385 to determine an elevation, grade or spatial position of the position of interest. The surveying measurement may be compared to data decoded from the barcode to determine any movement or changes associated with the position of interest. In that fashion, process 370 may be used to monitor earth movement.

FIG. 4 depicts a simplified graphical representation of data which may be encoded in a barcode associated with a position of interest according to one or more embodiments of the invention. Data encoded by a barcode (e.g., barcode 210) is graphically shown as data element 400 in FIG. 4. Data element 400 may include a plurality of fields associated with a position of interest. In one embodiment, data element 400 may be encoded in a barcode to include an identification number $405_1$, date of entry $405_2$, latitude coordinate $405_3$, longitude coordinate $405_4$ and feature information $405_n$. Identification number $405_1$ may relate to an identification number assigned by a surveying tool (e.g., surveying tool 100). However, it may also be appreciated that identification number $405_1$ may correlate to a predefined identifier, such as a government issued benchmark number.

The date of entry field $405_2$ may relate to a time and/or date that the barcode is encoded. As such, date of entry field $405_2$ can be useful when determining a rate of movement for a position of interest. Latitude and longitude elements $405_3$ and $405_4$ may relate to a global position data as determined by a surveying tool (e.g., surveying tool 100). Alternatively, latitude and longitude elements $405_3$ and $405_4$ may be received from a global positioning system (GPS) receiver.

Feature information field $405_n$ can be used for entering data by a user of the surveying tool related to the position of interest. For example, the location of a utility service in the vicinity of a surveying mark may be indicated. Further the feature information field $405_n$ can be a user provided description for the position of interest. According to another embodiment, feature information field $405_n$ may contain information regarding the absolute and/or relative position of other positions of interest, relative to the position of interest. For example, feature information field $405_n$ could contain position data of the next position of interest that the surveying tool may locate and measure. In that fashion, location of position of interest may be facilitated and time required to locate the point of interest may be reduced. Data element 400 has been described in FIG. 4 as having a plurality of data elements, however, it may be appreciated that a single field may be encoded into the barcode.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method of surveying, the method comprising the acts of:
   detecting a barcode on a surveying mark associated with a position of interest, wherein the barcode is detected based on imaging by a surveying tool;
   decoding the barcode to extract encoded data associated with feature information for the position of interest, the data including position data for the position of interest;
   performing a surveying measurement to determine position data for the position of interest, the surveying measurement performed by a position detection module of the surveying tool; and
   presenting the data associated with the position of interest to an operator of the surveying tool, wherein presenting includes displaying position data decoded from the barcode and displaying position data determined from the surveying measurement.

2. The method of claim 1, wherein the barcode is one of a two-dimensional barcode and a matrix code.

3. The method of claim 1, wherein the data extracted from the barcode relates to one of an elevation and a grade.

4. The method of claim 1, wherein the feature information for the position of interest includes at least one of a date of last entry, a longitude, a latitude, a location of a utility service, a location of a next position of interest, and user-provided data.

5. The method of claim 1, wherein presenting decoded data includes displaying the decoded data on the surveying tool, the decoded data associated with a barcode target identified by a target window displayed by the surveying tool.

6. The method of claim 1, further comprising labeling the position of interest with the barcode bearing the encoded data.

7. The method of claim 1, further comprising performing a surveying measurement for the position of interest based on orientation data decoded from the barcode.

8. The method of claim 7, further comprising evaluating a change in the position of interest based, at least in part, on the decoded data and surveying measurement, wherein evaluating includes comparing a result of the surveying measurement to data extracted from the barcode.

9. The method of claim 1, further comprising updating data provided by the barcode, wherein updating comprises:
   encoding data for the position of interest into an updated barcode; and
   labeling the position of interest with the updated barcode.

10. The method of claim 9, wherein the surveying tool further comprises a barcode printer and the updated barcode is printed from the barcode printer.

11. A surveying tool comprising:
   a display;
   a barcode scanner configured to detect a barcode associated with a position of interest, wherein the barcode is detected based on imaging by the barcode scanner;
   a position detection module; and
   a processor coupled to the display, the position detection module and the barcode scanner, the processor configured to:
      decode the barcode to extract data associated with the position of interest, the data including position data for the position of interest;
      control a surveying measurement by the position detection module to determine position data for the position of interest; and
      present decoded data including an angular position of the surveying tool with respect to the position of interest, to the display of the surveying tool, wherein the processor controls display of position data decoded from the barcode and display of position data determined from the surveying measurement.

12. The surveying tool of claim 11, wherein the barcode is one of a two-dimensional barcode, and a matrix code.

13. The surveying tool of claim 11, wherein the data extracted from the barcode relates to one of an elevation, and grade.

14. The surveying tool of claim 11, wherein the feature information for the position of interest includes at least one of a date of last entry, a longitude, a latitude, a location of a utility service, a location of a next position of interest, and user-provided data.

15. The surveying tool of claim 11, wherein presenting the decoded data includes displaying the decoded data on the display, the decoded data associated with a barcode target identified by a target window displayed by the surveying tool.

16. The surveying tool of claim 11, wherein the processor is further configured to determine a surveying measurement for the position of interest based on orientation data decoded from the barcode.

17. The surveying tool of claim 16, wherein the processor is further configured to evaluate a change in the position of interest based, at least in part, on the decoded data and surveying measurement, wherein evaluating a characteristic of the position of interest includes comparing a result of the surveying measurement to data extracted from the barcode.

18. The surveying tool of claim 11, wherein the processor is further configured to update data provided by the barcode, wherein updating comprises generating an updated barcode to be labeled to the position of interest, the updated barcode having data encoded for the position of interest.

19. The surveying tool of claim 11, further comprising a barcode printer configured to print barcodes containing the position and the elevation of the position of interest.

20. The surveying tool of claim 11, further comprising labeling the position of interest with the barcode bearing the encoded data.

* * * * *